March 5, 1968  G. H. E. COLESHILL ET AL  3,371,397

CUTTING TOOLS

Filed July 13, 1967  4 Sheets-Sheet 1

INVENTORS
Gerald Henry Ernest Coleshill
David Bradshaw Scott
BY
Watson, Cole, Grindle + Watson
attorneys March 5, 1968    G. H. E. COLESHILL ET AL    3,371,397
CUTTING TOOLS
Filed July 13, 1967    4 Sheets-Sheet 2
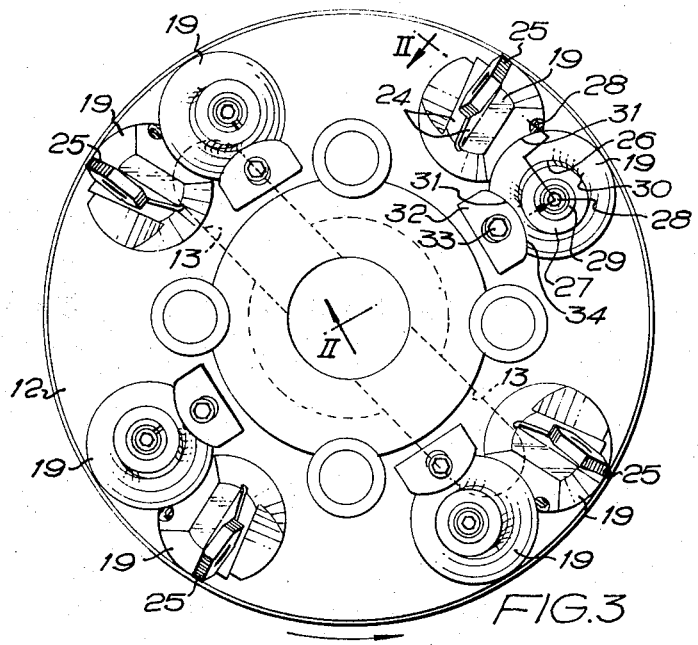
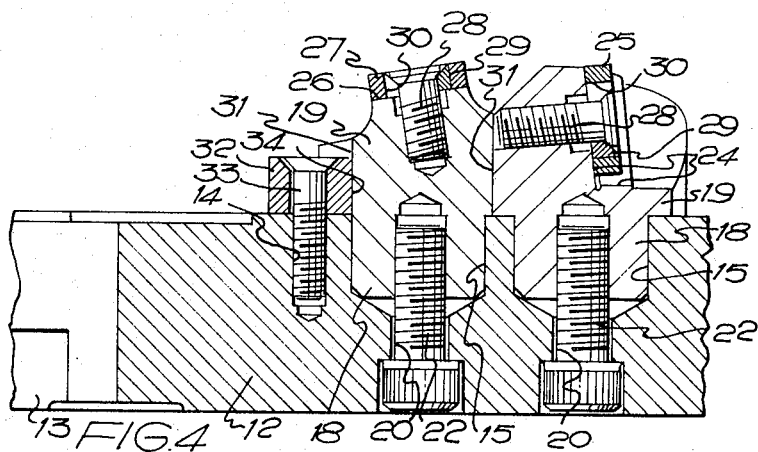
INVENTORS
Gerald Henry Ernest Coleshill
David Bradshaw Scott
BY
Watson, Cole, Grindle + Watson
Attorneys INVENTORS
Gerald Henry Ernest Coleshill
David Bradshaw Scott
BY
Watson, Cole, Grindle + Watson
Attorneys March 5, 1968  G. H. E. COLESHILL ET AL  3,371,397
CUTTING TOOLS Filed July 13, 1967  4 Sheets-Sheet 4

INVENTORS
Gerald Henry Ernest Coleshill
David Bradshaw Scott
BY
Watson, Cole, Grindle + Watson
Attorneys

United States Patent Office 3,371,397
Patented Mar. 5, 1968

3,371,397
CUTTING TOOLS
Gerald H. E. Coleshill and David B. Scott, Sheffield, England, assignors to Marsh Brothers & Co. Limited
Filed July 13, 1967, Ser. No. 653,251
Claims priority, application Great Britain, July 20, 1966, 32,498/66; May 12, 1967, 22,108/67, 22,109/67
17 Claims. (Cl. 29—105)

ABSTRACT OF THE DISCLOSURE

A milling cutter has a plurality of seatings for throwaway tips, each seating having a spigot to fit in one of a plurality of bores in the cutter body and a surface non-concentric with the spigot, retaining screws for the seatings, and locking means for each seating locating in an adjacent bore and having a surface complementary to and abutting the non-concentric surface on the seating, which locking means may be an adjacent seating, a locking plate or a spacing button also with a retaining screw, or a locking peg retained by engagement in a recess in the seating.

---

This invention relates to cutting tools, more particularly—but not exclusively—to face milling cutters of the type having a plurality of seating surfaces for throw-away tips of tungsten carbide or other "hard metal" around the outer regions of a circular body having one side adapted for location on and securing to a machine shaft, the seating surfaces being so disposed that the operative cutting edges will project from the other side of the body.

It is usual for a face milling cutter to be provided with seating surfaces on blocks let into recesses in the cutter body or formed in a detachable ring on the side of the cutter body remote from the side adapted for location on a machine shaft, with a view to saving the expense of machining a complicated body and to protecting the body from intolerable damage. However, the body or the ring is still comparatively complex and calls for various and very accurate machining operations, while the risk of intolerable damage to the body or the ring is still quite appreciable because of the close proximity of the metal of the body or the ring to the operative cutting edges of the tips.

The main object of the present invention is to provide replaceable seating means for a throwaway tip applicable to cutting tools, in particular to a face milling cutter of simple construction, yet with accurate location of the seating surfaces for throwaway tips. Another object is to provide a face milling cutter of simple construction with seating surfaces for different types of throwaway tips on the one cutter, with accurate location of the seating surfaces for one type of tip with respect to the seating surfaces for another type of tip and also with respect to the cutter body. A further object is to provide a built up construction of milling cutter affording considerable protection against intolerable damage to the cutter body and also applicable to a wide range of diameters of cutter with a comparatively small number of interchangeable parts.

According to the present invention, a cutting tool comprises a supporting body having at least a pair of holes and a seating with a spigot to fit closely in one of the bores, with at least one seating surface for a throwaway tip, with means for securing a tip to the seating, and with a surface non-concentric with the axis of the spigot, together with a retaining screw for the seating extending between the spigot and the other side of the supporting body, and locking means for the seating locating in the other bore and having a surface complementary to and abutting the non-concentric surface on the seating, whereby the seating is held against rotation and the orientation of its seating surface with respect to the supporting body is determined by its relationship to the non-concentric abutment surface.

The means for securing a tip to the seating may be a setscrew, to pass through a central hole in the tip, or through a split bush in the hole in the tip as frequently provided in throwaway tips; or it may be a clamp, or wedge, for use with a non-perforated tip. The head of the screw may be countersunk, where the hole in the tip or split bush is correspondingly formed.

The seating is preferably generally cylindrical, as proves convenient for manufacture from a length of bar stock, turned down from one end to form the spigot, which is drilled and tapped co-axially to receive the retaining screw. The abutment surface may be a portion of a surface preformed in the bar stock, or machined after turning-down the spigot. The seating surface may be milled and/or ground while the seating is located in a jig by the abutment surface.

While the invention is applicable to any form of cutting tool employing a throwaway tip and provides a readily replaceable seating for the latter, it is of considerable advantage when applied to cutting tools employing a plurality of tips, for example, a milling cutter.

Thus a face milling cutter may have a plurality of spigoted seatings fitting bores at the side of the cutter body remote from the side adapted for location on a machine shaft, each seating also having at least one seating surface for a throwaway tip, means for securing a tip to the seating, and a non-concentric abutment surface, together with retaining screws extending between the spigots and the side of the body adapted for location on a machine shaft. The locking means for the seatings may be locking plates with surfaces complementary to and abutting the non-concentric abutment surfaces on the seatings, or pairs of seatings may have one seating in each pair abutted by the other seating which is itself abutted by a locking plate, and retaining screws provided for the locking plates also, one seating in each pair having at least one seating surface for a roughing tip and the other seating having at least one seating surface for a finishing tip. Alternatively, each seating may be abutted by an adjacent seating, all the way round the cutter, so that separate locking means are not required. Some of the seatings may be replaced by spacing buttons with spigot and retaining screws provided for the spacing buttons also. Again, spaced seatings may be recessed adjacent the spigots to retain locking pegs projecting from bores in the body. The bores for the locking pegs for the individual spaced seatings are preferably disposed in the same radial planes as the respective seatings that the pegs each secure against rotation, so that the seatings are suitable for any diameter of cutter with the same orientation of the tips.

The retaining screws may extend through bores leading to counterbores into which fit the spigots of the seatings and, possibly, of locking plates or spacing buttons, or they may extend through bores in anchoring plugs fitting counterbores of holes into which fit the spigots of the seatings and, possibly, of locking plates or spacing buttons.

The cutter body is thus in the main a simple turning, bored and counterbored to receive the spigoted seatings and their retaining screws, with further bores and/or counterbores for locking plates with their retaining screws or for locking pegs. The seatings project from the body and, therefore, afford support for tips with their operative cutting edges well clear of the cutter body, so that the latter is protected against intolerable damage in the event of failure of one or more tips.

Four embodiments of the invention and a detail variation will now be described, by way of example only, with reference to the accompanying drawings, in which FIGURE 1 is a plan of one embodiment;

FIGURE 3 is a plan of another embodiment;

FIGURE 4 is a fragmentary developed section on the line IV—IV of FIGURE 3;

Figure 1:
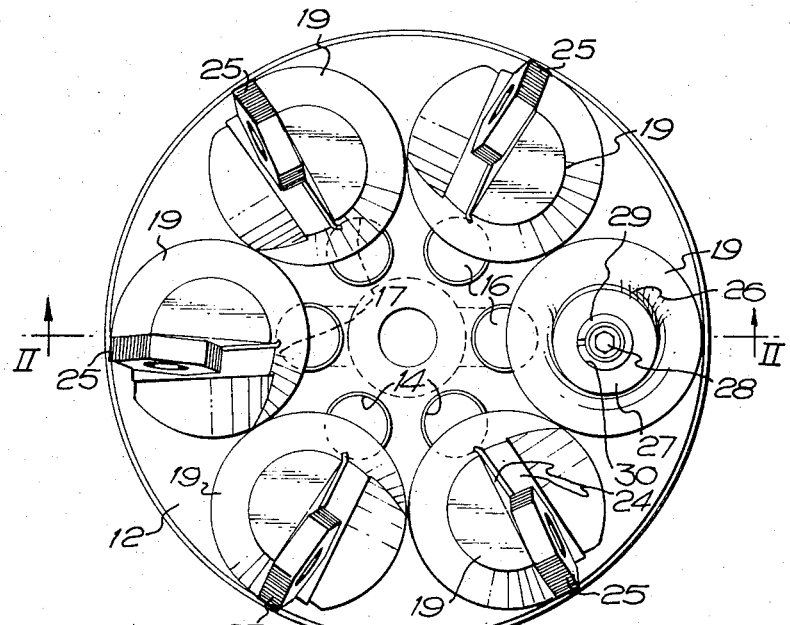
Figure 2:
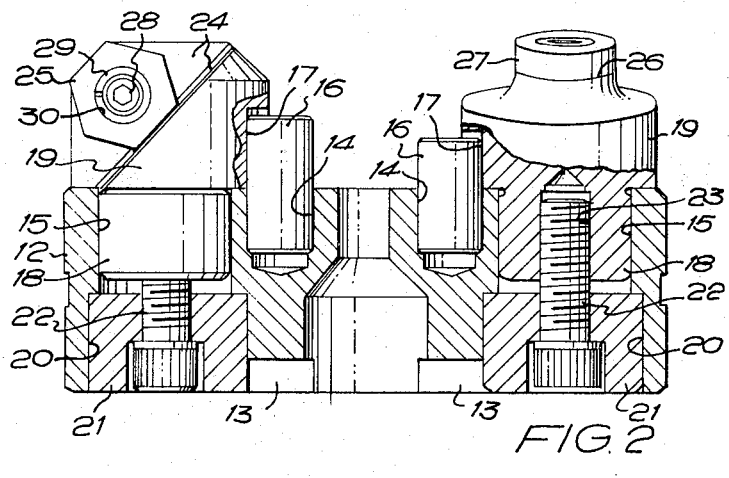
FIGURE 2 is a section generally on the line II—II of FIGURE 1.

In FIGURES 1 and 2, the body 12 of a face milling cutter is a simple bored and counterbored turning, except for a pair of slots 13 for location on a machine shaft (not shown), and has six pairs of bores 14, 15 each disposed in the same radial plane, the inner bore 14 in each pair being a blind bore from which projects a locking peg 16, which is retained by a recess 17 adjacent the spigot 18 of a generally cylindrical seating 19 fitting the outer bore 15, and the outer bore being counterbored at 20 from the other side of the cutter body to receive an anchoring plug 21 through which a retaining screw 22 extends into a tapped bore 23 in the spigot of the seating.

Each of five of the seatings 19 is provided with two seating surfaces 24 for a hexagonal throwaway roughing tip 25, while the remaining seating is provided with a single seating surface 26 for a circular throwaway finishing tip 27, and each tip is secured to its seating by a setscrew 28 passing through a split bush 29 in a hole 30 in the tip, the head of the screw being countersunk and the hole in the split bush being correspondingly formed (as can be seen in more detail in FIGURE 4).

As the seatings 19 are held against rotation by the pegs 16 engaging the recesses 17, the orientation of each tip 25 or 27 with respect to the body 12 is determined by the relationship of the seating surfaces 24 or 26 respectively to the corresponding recess 17.

In FIGURES 3 and 4, seatings 19 are arranged in pairs at regular intervals round the cutter body 12, one seating in each pair being adapted to support a roughing tip 25 and the other being adapted to support a finishing tip 27. An abutment surface 31 of each seating for a roughing tip 25 is abutted by the other seating, an abutment surface 31 of which is abutted by a locking plate 32 retained by a screw 33. Each locking plate 32 provides for accurate location of the seating surfaces 24, 25 respectively of both seatings 19 with respect to the cutter body 12, as well as with respect to each other. The seatings for both types of tips are generally cylindrical and of the same diameter, with the abutment surfaces 31 concave and of a radius equal to the radius of the seatings about axes parallel to the axes of the seatings, so that all the seatings can be formed from one section of bar stock, each locking plate 32 having a convex surface 34 of the same radius. The spigots 18 of the seatings 19 fit counterbores 15 of bores 20 for retaining screws 22.

Figure 5:
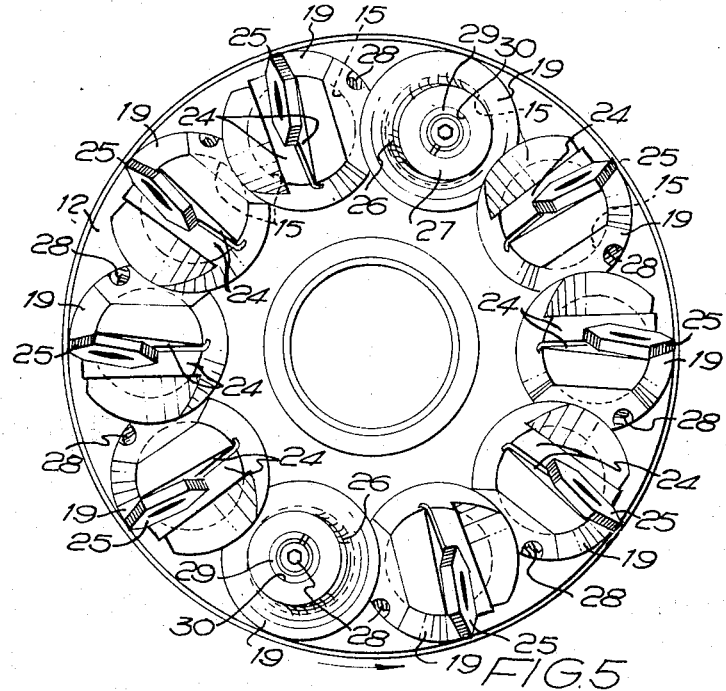
FIGURES 5 and 6 are plans of two further embodiments.

In FIGURE 5, the cutter body 12 has a single ring of bores 15 for seatings 19 each of which is abutted by an adjacent seating, all the way round the cutter, no separate locking means being required. Two of the seatings carry finishing tips 27, the remainder carrying roughing tips 25. The seatings may be retained either as shown in FIGURE 2 or as shown in FIGURE 4.

Figure 6:
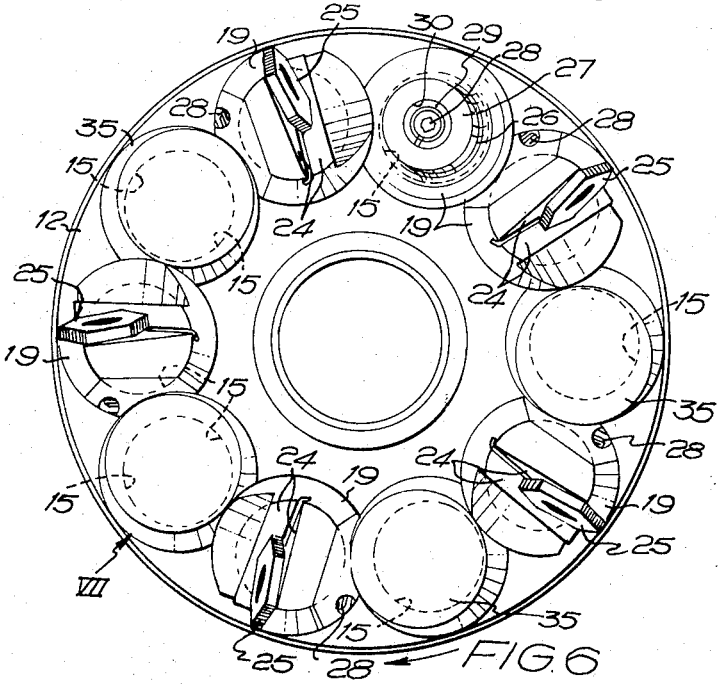
Figure 7:
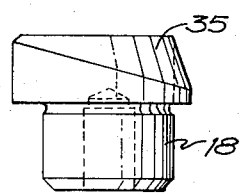
FIGURE 7 is a side elevation of a part of FIGURE 6 viewed in the direction of arrow VII.
Figure 8:
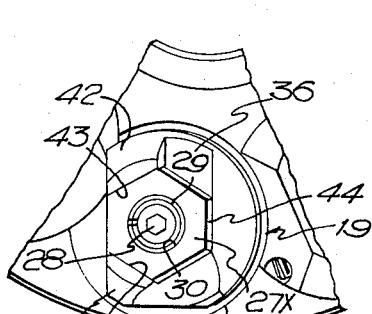
FIGURE 8 is a fragmentary plan corresponding to part of FIGURE 5 but showing a detail variation.
Figure 9:
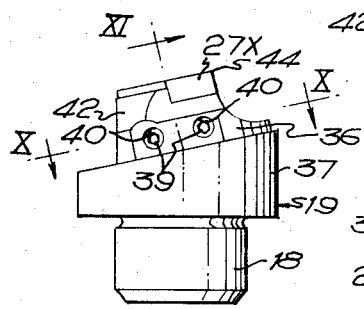
FIGURE 9 is a side elevation of a part of FIGURE 7 viewed in the direction of arrow IX.
Figure 10:
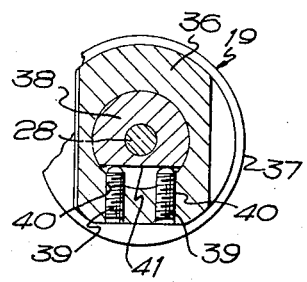
FIGURES 10 and 11 are sections on the lines X—X and XI—XI respectively of FIGURE 9.
Figure 11:
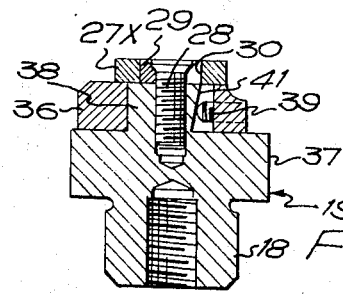

While the cutters of FIGURES 1 and 2, FIGURES 3 and 4, and FIGURE 5 are shown as for right-handed cutting, they would be adapted for left-hand cutting—as with the cutter of FIGURE 6—by replacement of the seatings 19 by seatings with seating surfaces facing oppositely but in all other respects similar. Thus the body 12 of the cutter of FIGURE 6 is identical with the body 12 of the cutter of FIGURE 5. However, in addition to showing a left-handed cutter, FIGURE 6 also shows seatings 19 for roughing tips 25 alternating with spacing buttons 35 (see also FIGURE 7) except in one position wherei nstead of a spacing button there is a seating for a finishing tip 27.

Although all the cutters illustrated include seatings for finishing tips as well as for roughing tips, with the operative cutting edges of the roughing tips at a greater radial distance from the axis of the cutter body than the operative cutting edges of the finishing tips, cutters with bodies as in FIGURES 1 and 2, FIGURE 5, and FIGURE 6 may be provided with seatings solely for roughing tips or solely for finishing tips.

In FIGURES 1 to 6, all the finishing tips 27 are shown as being circular, but other shapes of throwaway tips may be used as finishing tips, e.g., hexagonal tips, as shown in FIGURES 8 to 11, in which the seating 19 is divided into a seating part proper 36 and a mounting part 37 (with spigot 18), the part 36 being rotatable on a spigot 38 on the mounting part to a limited extent controlled by grubscrews 39, in tapped holes 40 in the seating part, bearing on opposite ends of a flat 41 on one side of the spigot. The seating part has a divided abutment 42 providing two faces 43 for location of the tip 27X by two sides separated by another, the tip being secured by a setscrew 28 passing through a split bush 29 in the hole 30 in the tip and into a tapped hole in the spigot 38, with head of the screw 28 countersunk and the hole in the split bush correspondingly formed. The screw 28 thus serves to hold the seating part on the mounting part, as well as holding the tip against the seating part. However, the flat 41 is undercut, so that the grubscrews assist in holding the seating part on the mounting part. By unscrewing one of the grubscrews 39 slightly and screwing up the other grubscrew, as may be appropriate, the orientation of the tip can be adjusted until the operative cutting edge 44 of the tip is precisely aligned for high quality finish-machining to be effected.

What we claim is:

1. A cutting tool comprising a supporting body having at least a pair of bores, and a seating with a spigot to fit closely in one of the bores, with at least one seating surface for a throwaway tip and with a surface non-concentric with the axis of the spigot, together with means for securing a tip to the seating, a retaining screw for the seating extending between the spigot and the other side of the supporting body, and locking means for the seating locating in the other bore and having a surface complementary to and abutting the non-concentric surface on the seating.

2. A milling cutter comprising a generally cylindrical body having a plurality of bores, and a plurality of seatings, a spigot on each seating fitting one of the bores, each seating also having at least one seating surface for a throwaway tip and a surface non-concentric with the axis of the spigot, together with means for securing a tip to each seating, retaining screws for the seatings extending between the spigots and the other side of the body, and locking means for the seatings locating in other bores and each having a surface complementary to and abutting the non-concentric surface on the respective seating.

3. A milling cutter as in claim 2, wherein the locking means for the seatings are locking plates with surfaces complementary to and abutting the non-concentric abutment surfaces on the seatings, and retaining screws are provided for the locking plates also.

4. A milling cutter as in claim 2, wherein the locking means for each seating is the adjacent seating.

5. A milling cutter comprising a generally cylindrical body having pairs of bores, and seatings with spigots fitting the bores and each having a surface non-concentric with the axis of the spigot, one seating in each pair abutting the non-concentric surface of the other seating, the non-concentric surface of which is abutted by a locking plate, having a complementary surface and one seating in each pair having at least one seating surface for a roughing tip, and the other seating having at least one seating surface for a finishing tip, together with means for securing a tip to each seating, retaining screws for the seatings extending between the spigots and the other side of the body, and retaining screws for the locking plates also.

6. A milling cutter as in claim 5, wherein the seatings for both types of tip are generally cylindrical and of the same diameter, with the abutment surfaces concave and of a radius equal to the radius of the seatings about axes parallel to the axes of the spigots, each locking plate having a convex surface of the same radius.

7. A milling cutter as in claim 5, wherein the seatings for finishing tips are each divided into a seating part proper and a mounting part with integral spigot, the seating part being rotatable on the mounting part and having at least one upstanding abutment for location of a throwaway tip having straight cutting edges, and means is provided for adjusting the position of the seating part with respect to the mounting part.

8. A milling cutter comprising a generally cylindrical body having a ring of bores, and seatings with spigots fitting the bores and each having a surface non-concentric with the axis of the spigot, with the non-concentric surface of each seating abutted by a complementary surface on an adjacent seating, all the way round the cutter, each seating also having at least one seating surface for a throwaway tip, together with means for securing a tip to each seating, and retaining screws for the seatings extending between the spigots and the other side of the body.

9. A milling cutter as in claim 8, wherein the seatings are generally cylindrical and of the same diameter, with the abutment surfaces concave and of the same radius of the seatings about axes parallel to the axes of the seatings.

10. A milling cutter as in claim 8, wherein some of the seatings are replaced by spacing buttons with spigots, and retaining screws are provided for the spacing buttons also.

11. A milling cutter as in claim 8, wherein the retaining screws extend through bores in anchoring plugs fitting counterbores of the bores into which fit the spigots of the seatings.

12. A milling cutter as in claim 8, wherein at least one of the seatings has a seating surface for a finishing tip and the remainder of the seatings have seating surfaces for roughing tips.

13. A milling cutter comprising a generally cylindrical body having a ring of bores, and seatings with spigots fitting the bores and each recessed adjacent the spigot, each seating also having at least one seating surface for a throwaway tip, together with means for securing a tip to each seating, retaining screws for the seatings extending between the spigots and the other side of the body, and locking pegs engaging the recesses in the seatings and being retained thereby in another ring of bores in the body.

14. A milling cutter as in claim 13, wherein the bores for the locking pegs for the individual spaced seatings are disposed in the same radial planes as the respective seatings that the pegs each secure against rotation.

15. A milling cutter as in claim 13, wherein at least one of the seatings has a seating surface for a finishing tip and the remainder of the seatings have seating surfaces for roughing tips.

16. A cutting tool comprising a supporting body having at least a pair of bores, and a seating divided into a seating part proper and a mounting part with an integral spigot fitting closely in one of the bores, the seating part being rotatable on the mounting part and having at least one upstanding abutment for location of a throwaway tip having straight cutting edges, and the mounting part having a surface non-concentric with the axis of the spigot, together with means for securing a tip to the seating part, a retaining screw for the mounting part extending between the spigot and the other side of the supporting body, locking means for the mounting part locating in the other bore in the body and having a surface complementary to and abutting the non-concentric surface on the mounting part, and means for adjusting the position of the sealing part with respect to the mounting part.

17. A cutting tool as in claim 16, wherein a screw for securing the tip enters a tapped hole in another spigot extending through the seating part from the mounting part and a pair of grubscrews in tapped holes through one side of the seating part bear on opposite ends of a flat on one side of that spigot.

References Cited

UNITED STATES PATENTS

| | | | |
|---|---|---|---|
| 1,415,339 | 5/1922 | Hall | 29—105 |
| 2,968,859 | 1/1961 | Garnett | 29—105 |
| 3,304,597 | 2/1967 | Kezran | 29—105 |

HARRISON L. HINSON, *Primary Examiner.*